United States Patent [19]
Baik et al.

[11] Patent Number: 5,500,741
[45] Date of Patent: Mar. 19, 1996

[54] VCR HAVING CAPABILITY OF DISPLAYING TIME SIGNAL RECEIVED FROM BROADCASTING STATIONS

[75] Inventors: Bok H. Baik, Kyungki-do; Jung H. Hur, Seoul; Dae S. Shim, Inchun-si, all of Rep. of Korea

[73] Assignee: Goldstar Co., Ltd., Seoul, Rep. of Korea

[21] Appl. No.: 132,181

[22] Filed: Oct. 5, 1993

[30] Foreign Application Priority Data

Feb. 18, 1993 [KR] Rep. of Korea .................. 1993-2245

[51] Int. Cl.⁶ .................. H04N 5/76; H04N 5/78; H04N 7/00; H04N 11/00
[52] U.S. Cl. .................. 358/335; 360/33.1; 348/460
[58] Field of Search .................. 358/335, 310, 358/342, 341, 343; 360/33.1, 19.1, 39, 59, 69, 75, 29; 348/460, 461, 465, 467, 468, 473, 474; H04N 5/76, 5/92, 5/78, 7/00, 11/00, 7/08, 7/084, 7/087

[56] References Cited

U.S. PATENT DOCUMENTS

| | | | |
|---|---|---|---|
| 4,860,268 | 8/1989 | Allgaier et al. | 368/47 |
| 5,237,412 | 8/1993 | Nakajima | 358/335 |
| 5,430,552 | 7/1995 | O'Callaghan | 358/335 |
| 5,432,558 | 7/1995 | Kim | 348/460 |

*Primary Examiner*—Thai Q. Tran
*Attorney, Agent, or Firm*—Finnegan, Henderson, Farabow, Garrett & Dunner

[57] ABSTRACT

A method of displaying time of a VCR including steps for checking whether current time data is received, determining states of the received current time data corresponding to a duty cycle at times when the current time data is received and converting the determined logic states of the current time data to current time. The current time is then displayed. The current time is superimposed on a video signal and a resultant superimposed signal is displayed. The resultant superimposed signal is recorded when the user requires recording of the current time together with the video signal.

7 Claims, 11 Drawing Sheets

VCR HAVING CAPABILITY OF DISPLAYING TIME SIGNAL RECEIVED FROM BROADCASTING STATIONS

BACKGROUND OF THE INVENTION

1. Field of the Invention

The present invention relates in general to video cassette recorders, and more particularly to a video cassette recorder (VCR) and a method of displaying time thereof, which are capable of receiving current time data transmitted from a broadcasting station and displaying the received data on a cathode ray tube (CRT) of a TV set or a monitor.

2. Description of the Prior Art

In conventional VCRs, there has been no means for automatically setting the current time upon power-on after a power-off or an interruption of power. For this reason, the user has to manually set the current time, which is inconvenient.

To solve this problem, a device for detecting a time siren of a broadcasting signal from a broadcasting station and correcting the current time according to the detected time siren has been proposed, and one example of this form is shown in Korean Utility Model application No. 87-23800, filed by GOLDSTAR CO., Ltd. This device is frequently misoperated since it detects the time siren by detecting an aural level. Also, in this case, much time is required in correcting the current time according to the time siren upon power-on after a power-off or an interruption of power, since the time siren is transmitted at a long interval from the broadcasting station. For example, in Korea, the time siren is transmitted once a day from the broadcasting station.

A VCR having a time display function is adapted to control various functions using the current time. For example, the current time becomes an operating basis to control functions such as reserve-recording, automatic playback, etc. For this reason, when the current time is incorrect, a desired broadcasting program may not be recorded in the reserve-recording mode or may be played back in the playback mode during the user's absence. Therefore, there has been required an arrangement which is capable of making the current time being displayed by a digitron display unit of the VCR correct and correcting a time error due to power-off or a crystal oscillator of the VCR at any time.

Many studies of time display apparatus have been made by watch manufacturing companies. One example of them is disclosed in U.S. Pat. No. 4,860,268, assigned to Junghance Co., Ltd., Germany, and is shown in FIG. 1, herein. In this patent, the time display apparatus contains a receiving circuit for receiving current time data which is placed on an amplitude modulation (AM) frequency and corrects the current time of a watch section by decoding the received current time data.

As shown in FIG. 1, the conventional time display apparatus comprises an amplifying and demodulating circuit 3 for receiving, through a receiving antenna 2, current time data which is AM-modulated in a broadcasting station and transmitted through a transmitting antenna 1. The circuit 3 amplifies and demodulates the received current time data, and a time equalizing processor 4 compares the current time from the amplifying and demodulating circuit 3 with the current time displayed on a watch section 5 and corrects the current time on the watch section 5 in accordance with the compared result.

To correct the current time, broadcasting stations for transmitting the AM frequency of a low frequency band have been established in countries such as U.S.A. and Germany. Also, watch products which contain the current time data receiving circuit and correct the current time of the watch section by decoding the received current time data are available from the watch manufacturing companies such as, for example, Junghance CO., Ltd., Germany.

However, the watch products available from Junghance CO., Ltd. and the time display apparatus in the above patent operate only to correct a faulty operation or a time error of the mechanical watch section. In particular, the time equalizing processor merely functions to decode the current time data, detect the current time of the watch section, and correct the current time of the watch section as a result of the comparison of the decoded current time data and the detected current time. Also, the current time data contains only hour and minute information without the second information. Further, the time equalization processor 4 continues to receive and process the current time data and subjected to an overload.

Also, the Junghance's watch products and patent have the following disadvantages when they are applied to the VCR, because they can be applied to only the watch fields.

First, there is no requirement to compare the decoded current time data with the detected current time, because a time display apparatus is driven by an electronic counter. For this reason, the time equalizing processor is unnecessary for the VCR.

Second, the VCR requires very accurate time which is beyond the capability of a simple control unit such as the time equalizing processor.

SUMMARY OF THE INVENTION

Therefore, the present invention has been made in view of the above problems, and it is an object of the present invention to provide a VCR and a method of displaying time thereof, which are capable of correcting a time error by decoding current time data transmitted from a broadcasting station and by displaying the decoded current time data directly on a digitron or a CRT of a TV set, utilizing a microcomputer.

It is another object of the present invention to provide a VCR and a method of displaying time thereof, which are capable of checking a faulty operation by detecting parity bits of decoded current time data utilizing a microcomputer.

It is a further object of the present invention to provide a VCR and a method of displaying time thereof, which are capable of automatically recording decoded current time data on a video tape or a disc together with a desired broadcasting program utilizing a microcomputer so that the user can confirm the time that the desired broadcasting program is recorded, and activating a time siren or alarm every hour on the hour utilizing the microcomputer so that the user can recognize the current time.

It is still a further object of the present invention to provide a VCR and a method of displaying time thereof, which are capable of detecting a summer time bit of the decoded current time data indicating summer time and displaying the current time as summer time, utilizing a microcomputer.

It is yet another object of the present invention to provide a VCR and a method of displaying time thereof, which are capable of correcting the current time using a crystal oscillator when an error is generated in the current time data utilizing a microcomputer.

In accordance with one aspect of the present invention, a VCR is provided comprising receiving means for receiving a current time signal of radio wave from a broadcasting station and for demodulating the received current time signal; wave-shaping means for converting the demodulated current time signal from the receiving means into a digital signal and for outputting the resultant current time data; tuning means for receiving audio and video signals of radio wave from the broadcasting station and for tuning the received audio and video signals to a reference frequency; recording/playback means for recording and playing back the audio and video signals and the current time signal from the broadcasting station; control means for controlling the whole operation of the VCR, for determining a logic of the current time data from the wave-shaping means by checking its duty and for converting the current time data into the current time in accordance with the determined logic; on-screen display means for superimposing the current time on the video signal from the tuning means under the control of the control means and for outputting the resultant signal to the recording/playback means or external display means; character display means for displaying the current time from the control means; and key matrix means for applying function signals to the control means according to a user's selection.

In accordance with another aspect of the present invention, a method of displaying time for a VCR is provided, comprising the steps of: (a) determining whether current time data is received, determining a logic of the received current time data by checking its duty if the current time data is received and converting the determined logic of the current time data into the current time; (b) displaying the current time; (c) superimposing the current time on a video signal and displaying the resultant signal; and (d) superimposing the current time on the video signal and recording the resultant signal, when the user requires that the current time be recorded together with the video signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
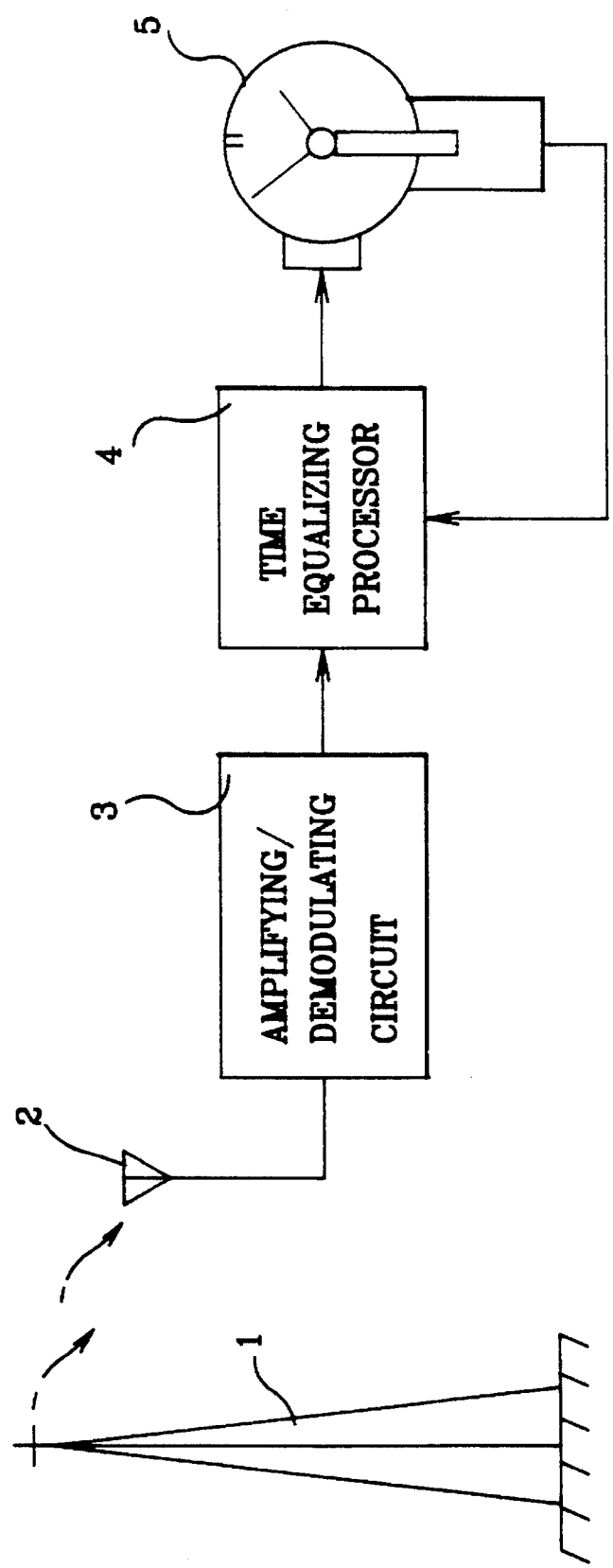
FIG. 1 is a schematic block diagram of a conventional time display apparatus.
Figure 2:
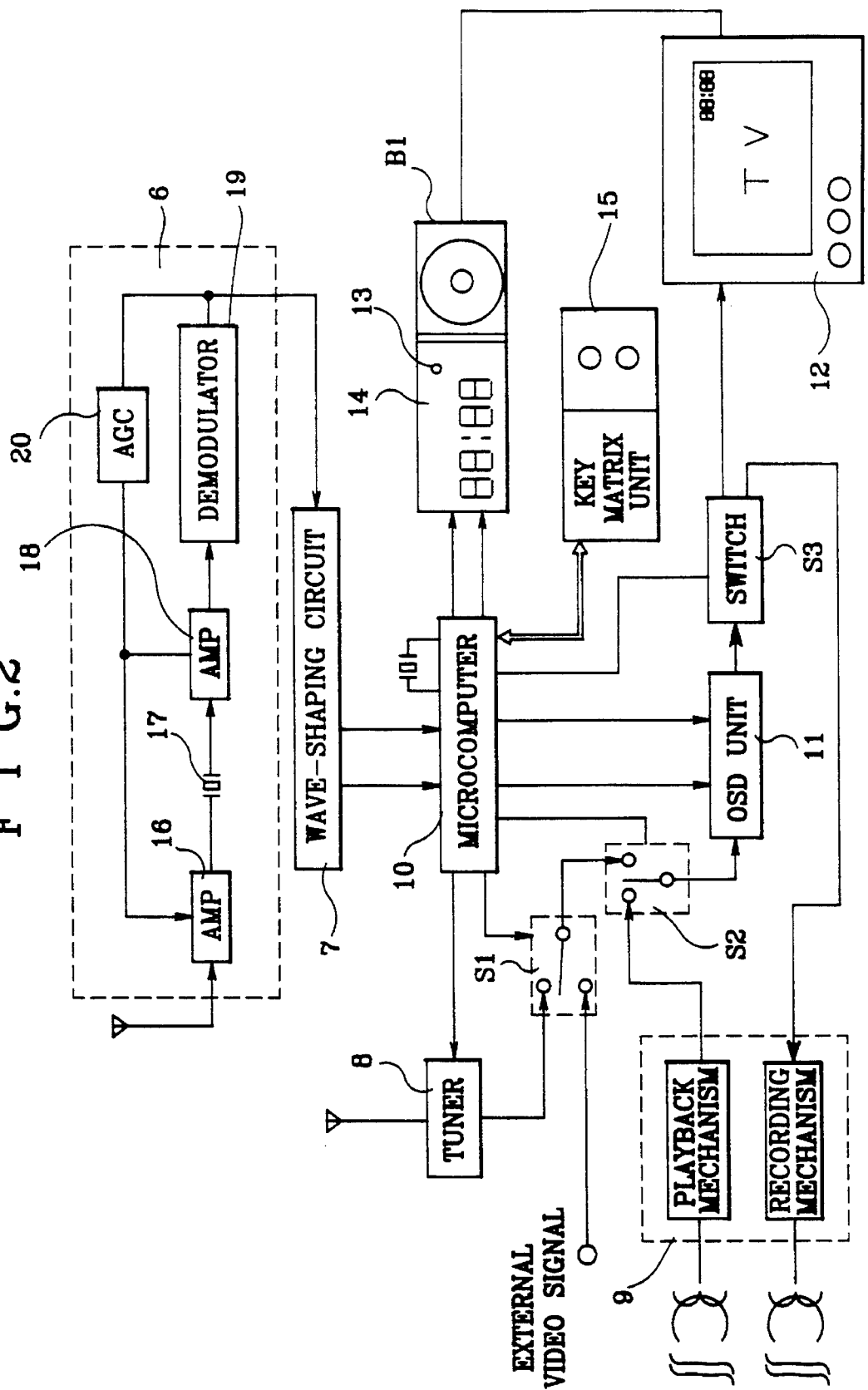
FIG. 2 is a detailed block diagram of a VCR in accordance with an embodiment of the present invention.

Referring to FIG. 2, a detailed block diagram of a VCR is shown in accordance with an embodiment of the present invention. As shown in this drawing, the VCR includes a receiving circuit 6 for receiving a current time signal of radio wave from a broadcasting station, amplifying the received current time signal and demodulating the amplified current time signal, a wave-shaping circuit 7 for converting the demodulated current time signal from the receiving circuit 6 into a digital signal and outputting the resultant current time data, a tuner 8 for receiving audio and video signals of radio wave from the broadcasting station and tuning the received audio and video signals to a reference frequency, a recording/playback section 9 for recording and playing back the audio and video signals and the current time signal from the broadcasting station, and a microcomputer 10 for controlling the whole operation of the VCR, determining a logic of the current time data from the wave-shaping circuit 7 by checking its duty and converting the current time data into the current time in accordance with the determined logic.

The microcomputer 10 is adapted to transmit the reference frequency corresponding to a channel selected by the user as data to the tuner 8 and select any one of an output signal from the tuner 8, an output signal from the recording/playback section 9 and an external video signal.

Also, the VCR includes an on-screen display (OSD) unit for superimposing a timer signal or the current time on the video signal from the tuner 8 or the recording/playback section 9 under the control of the microcomputer 10 and outputting the resultant signal to the recording/playback section 9 so that the current time can be recorded together with the video signal by the recording/playback section 9, a light emitting indicator 13 for indicating summer time when the current time from the microcomputer 10 is the summer time, a character display unit 14 for displaying the current time from the microcomputer 10, a key matrix unit 15 for applying a summer time display function signal or a time siren function signal to the microcomputer 10 according to a user's selection, and a buzzer B1 for generating a time siren when the time siren function is selected by the user.

The VCR also includes a switch S1 for selecting one of the video signal from the tuner 8 and the external video signal under the control of the microcomputer 10, a switch S2 for selecting one of an output signal from the switch S1 and the output signal from the recording/playback section 9 under the control of the microcomputer 10, and a switch S3 for outputting an output signal from the OSD unit 11 to the recording/playback section 9 under the control of the microcomputer 10. The switch S3 also functions to output the superimposed current time from the OSD unit 11 to a television (TV) set 12, which processes the received superimposed current time to display it thereon.

In accordance with the embodiment of the present invention, the receiving circuit 6 includes an amplifier 16 for receiving the current time signal of radio wave from the broadcasting station through a receiving antenna and amplifying the received current time signal, a filter 17 for filtering an output signal from the amplifier 16, an amplifier 18 for amplifying an output signal from the filter 17, a demodulator 19 for demodulating an output signal from the amplifier 18, and an automatic gain controller (AGC) for lowering amplification degrees of the amplifiers 16 and when intensities of electric field to the amplifiers 16 and 18 are strong and raising the amplification degrees when the intensities of the electric fields are weak, so that the current time signal can be maintained at a fixed level.

The operation of the VCR with the above-mentioned construction in accordance with the embodiment of the present invention will hereinafter be described in detail with reference to FIG. 2.

The current time signal which is AM-modulated in the broadcasting station and transmitted through a transmitting antenna is received through the receiving antenna by the amplifier 16, which amplifies the received current time signal and outputs the amplified current time signal to the filter 17. The current time signal filtered by the filter 17 is again amplified by the amplifier 18 and then demodulated by the demodulator 19.

The demodulated current time signal from the demodulator 19 is wave-shaped by the wave-shaping circuit 7 into a digital current time signal that can be recognized by the microcomputer 10. The microcomputer 10 receives the digital current time data from the wave-shaping circuit 7 at its input port and then determines the logic of the inputted digital current time data by checking its duty.

Figure 3:
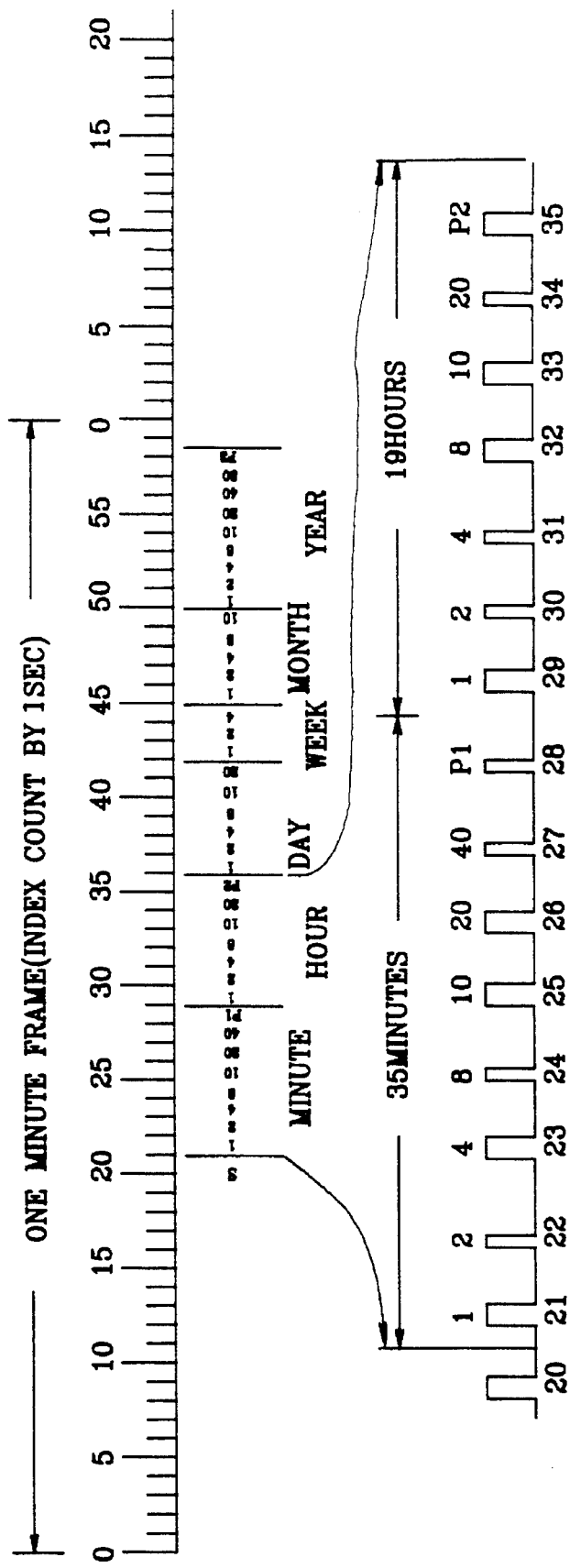
FIG. 3 is a view illustrating a time code format in accordance with the present invention.

FIG. 3 illustrates a time code format in accordance with the present invention. In the time code format of the current time data, each frame is a one minute frame consisting of 59 digit time slots and no frame synchronous pulse. Also, the one minute time frame contains various information. The microcomputer 10 recognizes the various information by checking duties of bits of the one minute frame designating the information. Namely, as shown in FIG. 3, the 21st to 58th bits of the one minute frame designate minutes, hour, date, day, week, month, year, and start and parity information, respectively. The 18th bit thereof designates the summer time.

The microcomputer 10 checks the duties of the bits of the current time data in 1 msec units. As a result of the checking, each bit is a logic 0 when its high state duration is 100 msec and a logic 1 when its high state duration is 200 msec. The logic bits of the current time data determined in this manner is stored in a RAM of the microcomputer 10 at a period of 1 sec. Since no frame synchronous pulse is present, the microcomputer 10 recognizes the end of the current time data of one frame when the duty counting continues for 2 sec and an index count is 59. Then, the microcomputer converts the logic bits of the current time data stored in the RAM into the current time. Also, the microcomputer 10 checks the summer time bit of the current time data to determine whether the current time is the summer time.

The current time analyzed by the microcomputer 10 is displayed by the character display unit 14. When the current time from the microcomputer 10 is the summer time, the light emitting indicator 13 is turned on to inform the user that the current time is the summer time. Also, when the time siren generation is desired by the user using the key matrix unit 15, the buzzer B1 is turned on to generate the time siren.

The microcomputer 10 also pre-stores the reference frequencies corresponding to various channels of the broadcasting stations. When a channel is selected by the user, the microcomputer 10 transmits the reference frequency corresponding to the selected channel as data to the tuner 8, allowing the tuner 8 to be at a broadcast receiving state. As a result, the tuner 8 receives the audio and video signals from the corresponding broadcasting station and performs high frequency-amplification and frequency conversions for the received audio and video signals. The recording/playback section 9 records the audio and video signals from the tuner 8 or plays back the recorded audio and video signals.

The output signal from the tuner 8 and the output signal from the recording/playback section 9 can be displayed on the TV set 12 by the switches S1 and S2 under the control of the microcomputer 10. In order to display the current time from the broadcasting station on the TV set 12, the microcomputer 10 applies the current time data to the OSD unit 11, which then outputs the applied data to the TV set 12 through the switch S3. As a result, the current time can be displayed as a caption in the TV set 12.

Namely, the OSD unit 11 superimposes the current time on the video signal from the tuner 8 or the recording/playback section 9 under the control of the microcomputer 10 and outputs the resultant signal to the TV set 12. Also, in order to superimpose the current time on the video signal for an initial several seconds of the recording of the video signal in the recording/playback section 9, the OSD unit 11 outputs the video signal on which the current time is superimposed to the recording/playback section 9 for the several seconds through the switch S3 under the control of the microcomputer 10. As a result, the video signal on which the current time is superimposed can be recorded in the recording/playback section 9.

Figure 4:
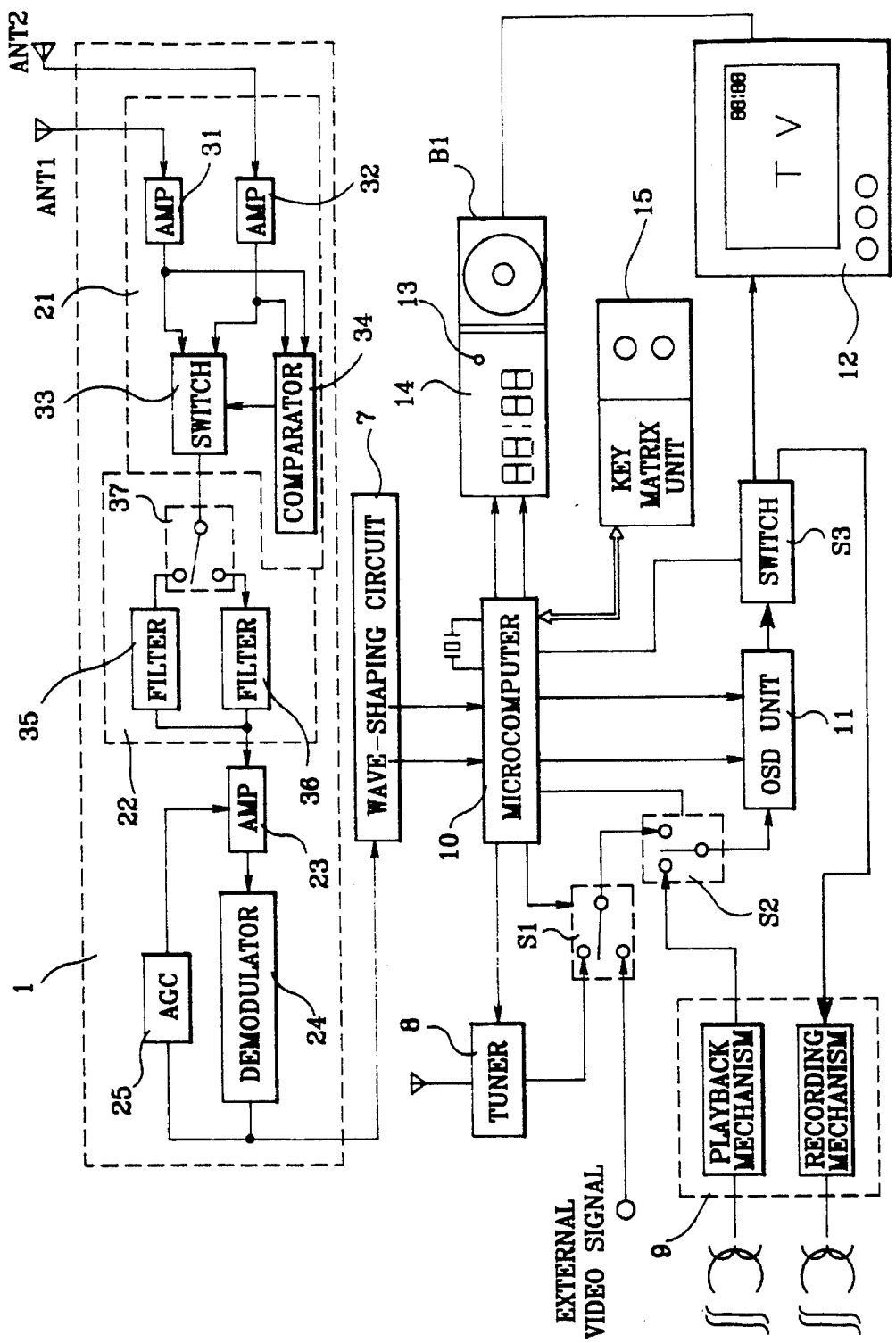
FIG. 4 is a detailed block diagram of a VCR in accordance with an alternative embodiment of the present invention.

Referring to FIG. 4, a detailed block diagram of a VCR is shown in accordance with an alternative embodiment of the present invention. The construction in this drawing is substantially the same as that in FIG. 2, with the exception that the construction of the receiving circuit 6 is different from that in FIG. 2. In FIG. 4, the receiving circuit 6 includes a reception sensitivity selecting circuit 21 for receiving the current time signal of radio wave from the broadcasting station in different receiving directions and selecting the current time signal of a better reception sensitivity, a frequency selecting circuit 22 for selecting a frequency convenient for reception when the VCR is placed at a center position between two broadcasting station regions of different transmitting frequencies for the current time signal, an amplifier 23 for amplifying an output signal from the frequency selecting circuit 22, a demodulator 24 for demodulating an output signal from the amplifier 23, and an automatic gain controller 25 for lowering an amplification degree of the amplifier 23 when an intensity of an electric field to the amplifier 23 is strong and raising the amplification degree when the intensity of the electric field is weak, so that the current time signal can be maintained at a fixed level.

The reception sensitivity selecting circuit 21 includes an amplifier 31 for receiving the current time signal of radio wave from the broadcasting station through a receiving antenna and amplifying the received current time signal, an amplifier 32 for receiving the current time signal of radio wave from the broadcasting station through another receiving antenna of a receiving direction different from that of the amplifier 31 and amplifying the received current time signal, a switch 33 for selecting one of output signals from the amplifiers 31 and 32, and a comparator 34 for comparing the output signals from the amplifiers 31 and 32 to each other to select the one having the better reception sensitivity and controlling the switch 33 in accordance with the compared result.

The frequency selecting circuit 22 includes a filter 35 for performing a filtering operation at the transmitting frequency of one of the broadcasting station regions, a filter 36 for performing a filtering operation at the transmitting frequency of the other of the broadcasting station regions, and a switch 37 for selecting one of the filters 35 and 36.

Now, the operation of the VCR in accordance with the alternative embodiment of the present invention will be described in detail with reference to FIG. 4.

One of the filters 35 and 36 is selected by the switch 37, in order to select a frequency convenient for reception when the VCR is placed at a center position between two broadcasting station regions of different transmitting frequencies for the current time signal. In the reception sensitivity selecting circuit 21, the amplifiers 31 and 32 receive the current time signal of radio wave from the broadcasting station in different receiving directions and amplify the received current time signals. The comparator 34 compares the output signals from the amplifiers 31 and 32 to each other to select the one having the better reception sensitivity and controls the switch 33 in accordance with the compared result. As a result, the current time signal of the better reception sensitivity is selected by the switch 33 and then applied to the previously selected one of the filters 35 and 36.

The filtered current time signal is amplified by the amplifier 23, demodulated by the demodulator 24 and then applied to the wave-shaping circuit 7.

Figure 5:
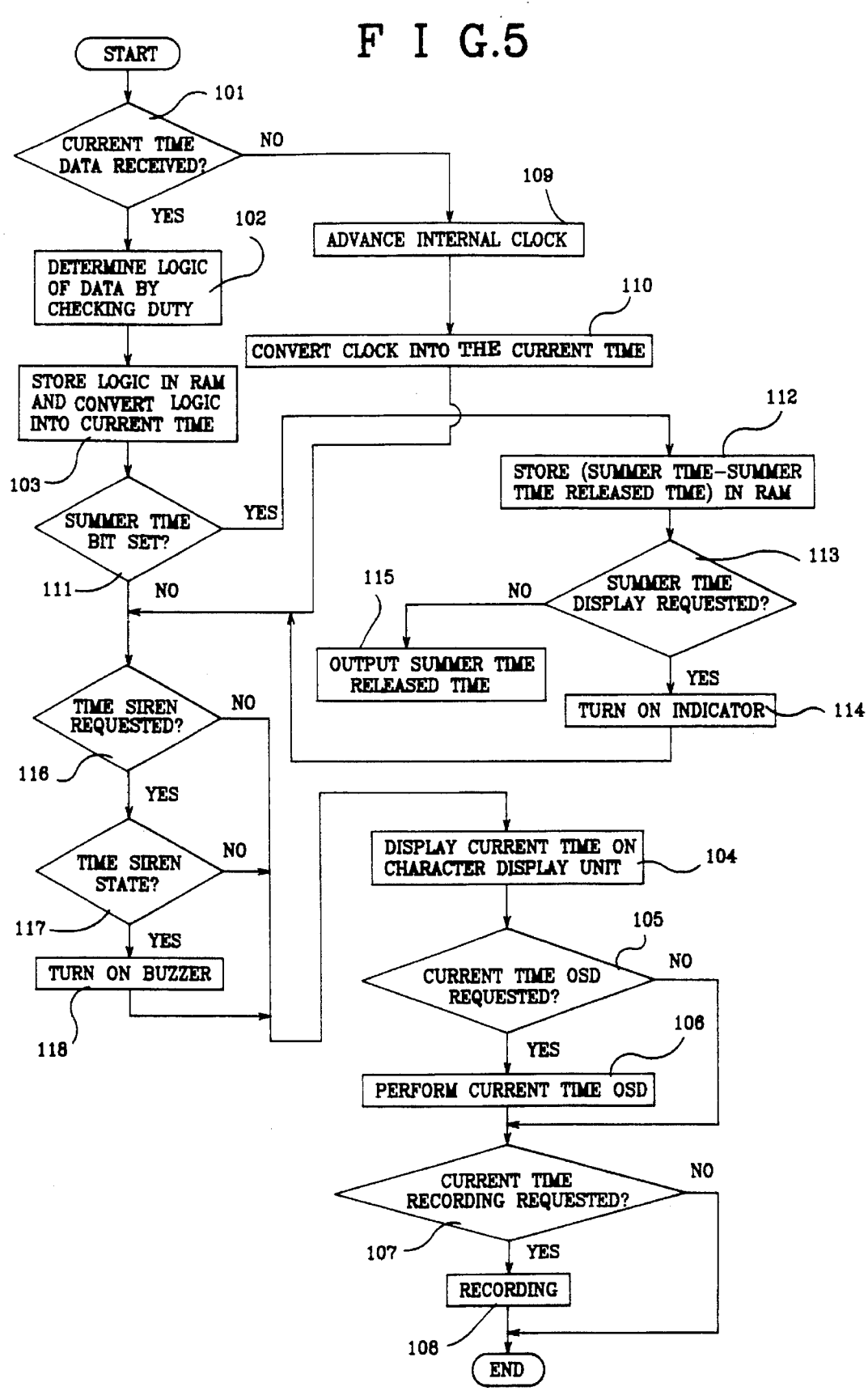
FIG. 5 is a flowchart illustrating a method of displaying time for the VCR in accordance with the present invention.

Referring to FIG. 5, a flowchart is shown illustrating a method of displaying the time of the VCR in accordance with the present invention. As shown in this drawing, the time display method includes a first step (101-103) of determining whether current time data is received, determining a logic of the received current time data by checking its duty if the current time data is received, storing the determined logic of the current time data in a RAM and converting the stored logic of the current time data into the current time, The method includes a second step (104) of displaying the current time in Arabic numerals on the character display unit 14, and a third step (105 and 106) of transmitting the current time to the OSD unit 11 upon applying of a current time superimpose request signal to the microcomputer 10, so that the current time can be superimposed on the external video signal or the video signal from the tuner 8 or the recording/playback section 9 and the resultant signal can be displayed on the TV set 12. The method includes a fourth step (107 and 108) of superimposing the current time on the video signal and recording the resultant signal in the recording/playback section 9 when the user requires that the current time be recorded together with the video signal.

Also, the time display method includes a fifth step (101, 109 and 110) of advancing an internal clock if it is determined at the first step that the current time data is not received, converting the advanced clock into the current time and then performing the second step. The method includes a sixth step (111-115) of determining, after the first step, whether the summer time bit has been set in the current time data and selecting the summer time or summer time released time according to a user's selection if it is determined that the summer time bit has been set in the current time data. The method includes a seventh step (116-118) of driving the buzzer 31 to generate the time siren upon applying the time siren generation request signal after the first step, the fifth step or the sixth step.

Upon receiving the current time data in the format as shown in FIG. 3 from the wave-shaping circuit 7 at step 101, the microcomputer 10 checks the duties of the bits of the current time data in the 1 msec units. As a result of the checking, each bit is a logic 0 when its high state duration is 100 msec and a logic 1 when its high state duration is 200 msec. In this manner, the logic bits of the current time data is determined at step 102.

The determined logic bits of the current time data is stored in the RAM of the microcomputer 10 at a period of 1 sec. Upon detection of the end of the current time data of one frame, the microcomputer 10 analyzes the logic bits of the current time data stored in the RAM and converts the current time data into the current time in accordance with the analyzed result at step 103.

The current time analyzed by the microcomputer 10 is displayed in the Arabic numerals by the character display unit 14 at step 104. Upon applying the current time OSD or superimpose request signal at step 105, the microcomputer 10 transmits the current time to the OSD unit 11. As a result, at step 106, the current time can be superimposed on the external video signal or the video signal from the tuner 8 or the recording/playback section 9 and the resultant signal can be displayed on the TV set 12. Also, when the user requires that the current time be recorded together with the video signal at step 107, the microcomputer 10 transmits the current time to the OSD unit 11. As a result, at step 108, the current time can be superimposed on the video signal and the resultant signal can be recorded in the recording/playback section 9.

On the other hand, if no current time data is received at step 101, the microcomputer 10 advances the internal clock, converts the advanced clock to the current time and then performs the second step after step 110.

When the summer time bit has been set in the current time data at step 111, the microcomputer 10 subtracts the summer time released time from the summer time and stores the resultant value in the RAM at step 112. Then, the microcomputer 10 checks at step 113 whether the summer time display request signal is applied by the user. If it is, the microcomputer 10 outputs the summer time and then performs the second step. Also, at step 114, the microcomputer 10 turns on a light emitting diode (LED) as the light emitting indicator 13 to inform the user that the current time is the summer time. When the summer time display request signal is not applied by the user, the microcomputer 10 outputs the summer time released time and then performs the second step at step 115.

Upon application of the time siren generation request signal at step 116 after the first step, the fifth step or the sixth step, the microcomputer 10 checks at step 117 whether the current state is a time siren generation state. If it is that the current state is the time siren generation state, the microcomputer 10 turns on the buzzer 31 to generate the time siren and then performs the second step at step 118.

Now, the steps of the method of displaying the time of the VCR in accordance with the present invention will be described in more detail with reference to FIGS. 6 to 10.

Figure 6A:
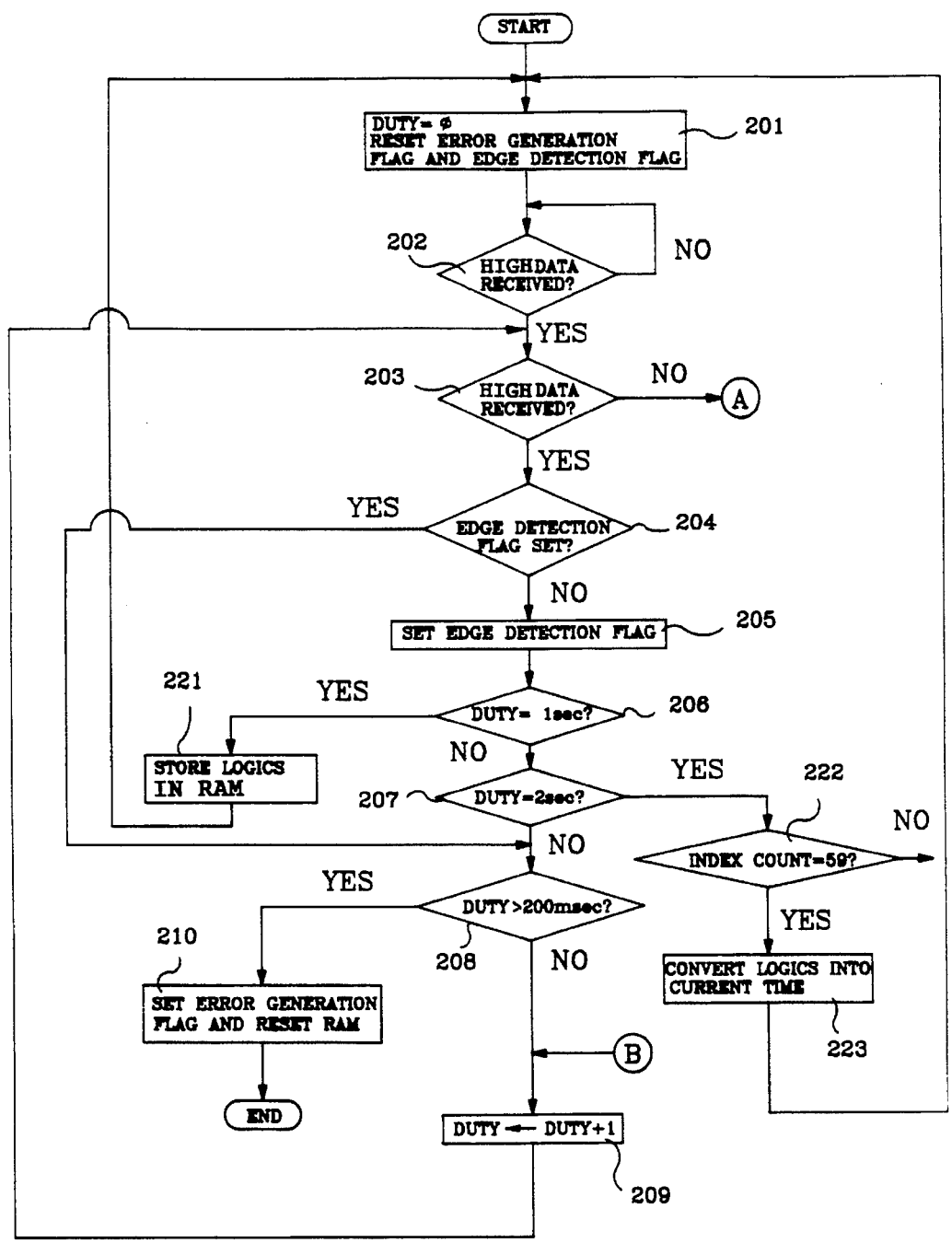
FIGS. 6A and 6B are flowcharts illustrating the step of checking a duty of the current time data in the method shown in FIG. 5.
Figure 6B:
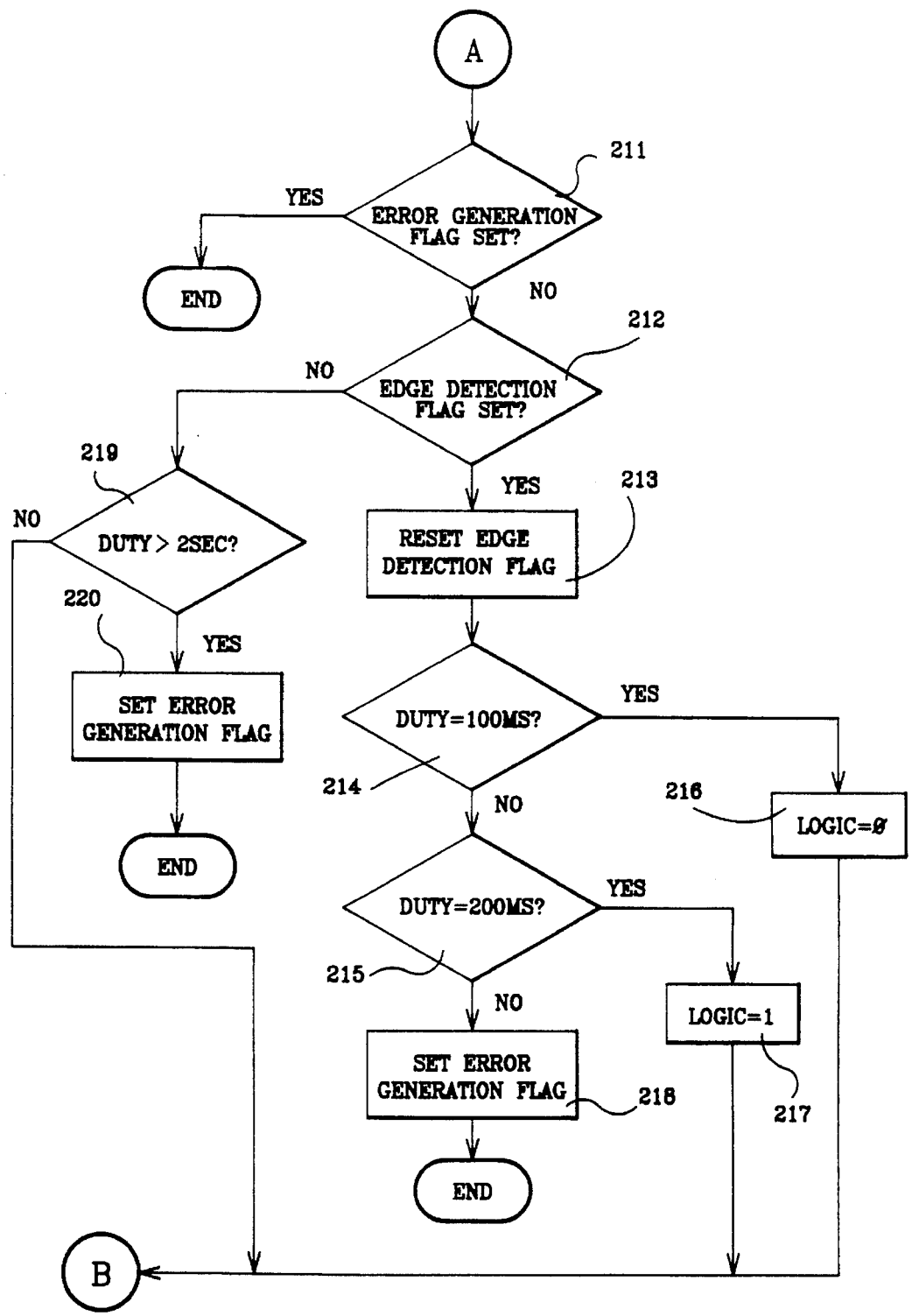

Referring to FIGS. 6A and 6B, flowcharts are shown illustrating the first step of checking the duty of the current time data in the method shown in FIG. 5. Upon receiving the current time data with the format as shown in FIG. 3, the microcomputer 10 clears the duty of the current time data and resets an error generation flag and an edge detection flag at step 201. At step 202, the microcomputer 10 waits for the current time data to go high. If it is determined at step 203 that the current time data is high, the edge detection flag is checked at step 204 to see if it has been set. The microcomputer 10, at step 205, sets the edge detection flag since it has been reset at the initial state. Step 206 and step 207 checks whether the duty is 1 sec or 2 sec. Step 208 checks whether the duty is greater than 200 msec. The microcomputer 10 increments the duty by 1 since the duty is initially set to 0 and then returns to step 203 after step 209.

The microcomputer 10 continuously increments the duty through the steps 203, 204, 208 and 209. At this time, if the input data is high at step 203, although the duty has exceeded 200 msec at step 208, the microcomputer 10 sets the error generation flag and resets the value stored in the RAM at the step 210. On the other hand, if the input data goes low at the step 203 before the duty exceeds 200 msec at step 208, the microcomputer 10 checks at step 211 whether the error generation flag has been set and then checks at step 212 whether the edge detection flag has been set.

Because the edge detection flag has been set at step 205, it is reset at the step 213. The microcomputer 10 then checks at step 214 and step 215 whether the duty, namely, the high state duration of the input data, is 100 msec or 200 msec. The microcomputer 10 sets the logic of the input data to 0 at step 216 if the high state duration is 100 msec at step 214, and to 1 at step 217 if it is 200 msec at step 215. Then, the microcomputer 10 proceeds to step 209 (FIG. 6A) to increment the duty by 1. If the high state duration of the input data is neither 100 msec nor 200 msec, the microcomputer 10 sets the error generation flag at step 218.

Again, the microcomputer 10 checks the state of the input data at step 203. If the input data is not high, the microcomputer 10 checks the state of the error generation flag at step 211 and the state of the edge detection flag at step 212. Since the edge detection flag has been reset at step 213, the microcomputer 10 checks at step 219 whether the duty is greater than 2 sec. If the duty is not greater than 2 sec, the microcomputer 10 increments the duty by 1 at step 209 and then proceeds to step 203, to check the state of the input data. As a result, the duty is continuously incremented through the steps 203, 211, 212, 219 and 209.

At this time, if the input data is low at the step 203 and the duty has exceeded 2 sec at step 219, the microcomputer 10 sets the error generation flag at step 220. If the input data goes high at step 203 before the duty exceeds 2 sec at step 219, the microcomputer 10 checks at step 204 whether the edge detection flag has been set. The edge detection flag is again set at the step 205 since it has been reset at step 213. It is then checked at step 206 or step 207 whether the duty is 1 sec or 2 sec. If the duty is 1 sec at step 206, the logics determined at steps 216 and 217 are stored in the RAM at step 221. Then, the microcomputer 10 returns to the initial state at step 201 to perform the above operation again. Namely, the microcomputer 10 determines the logics of the remaining bits of the current time data of one frame and stores the determined logics into the RAM at step 221. On the other hand, if the duty is 2 sec at step 207, the microcomputer 10 recognizes that the current time data of one frame is complete, and then checks at step 222 whether an index count is 59. If the index count is 59, the microcomputer 10 converts the logic of the current time data stored in the RAM at step 221 into the current time at step 223.

Figure 7:
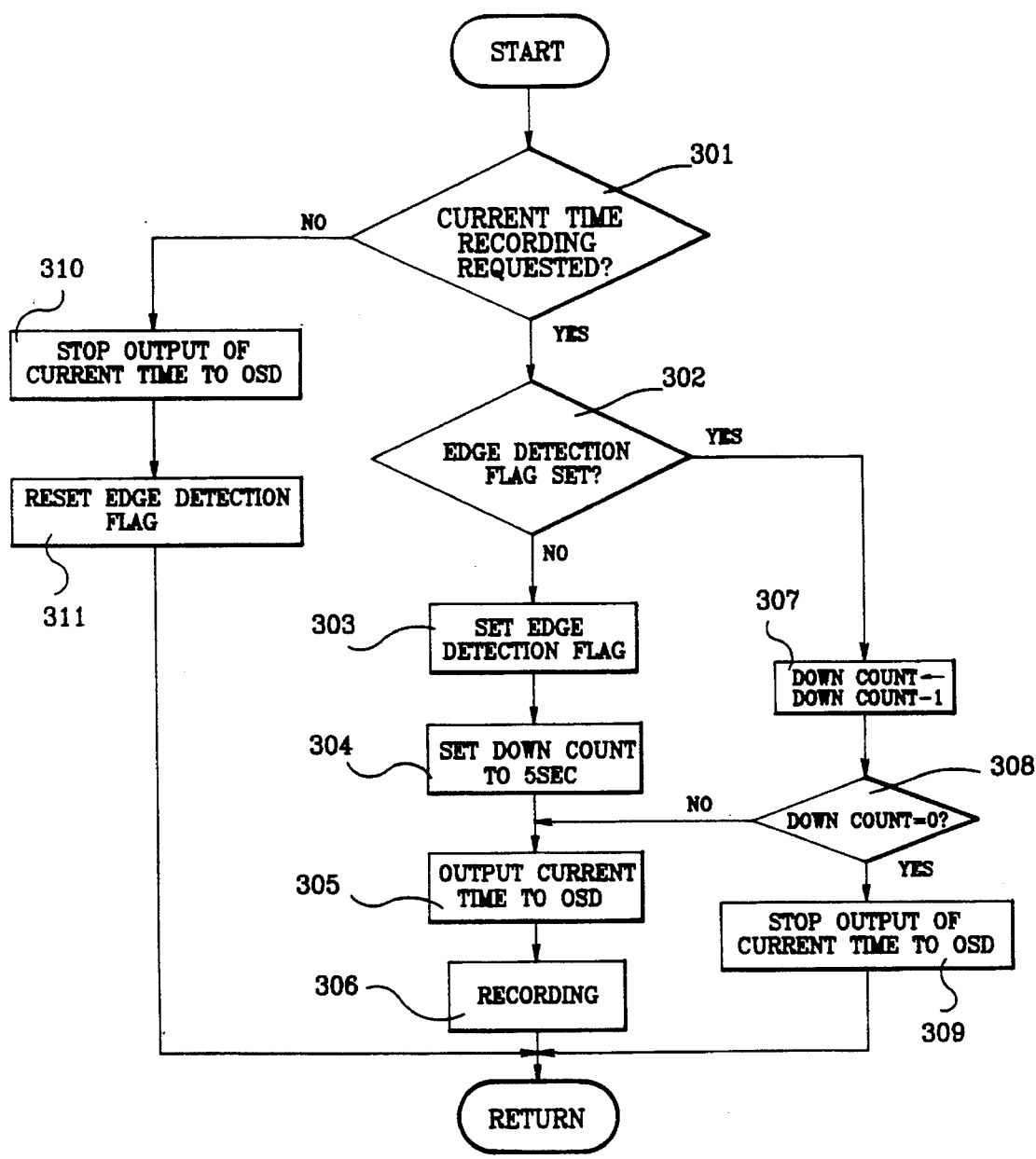
FIG. 7 is a flowchart illustrating the step of superimposing the current time on a video signal and recording the resultant video signal in the method shown in FIG. 5.

Referring to FIG. 7, a flowchart is shown illustrating the fourth step of superimposing the current time on the video signal and recording the resultant video signal in the method shown in FIG. 5. It is first checked at step 301 whether a current time recording request signal is received. If the current time recording request signal is received, the microcomputer 10 sets the edge detection flag at steps 302 and 303 and sets a down count to 5 sec at step 304. At step 305, the current time is superimposed on the video signal and the resultant signal is outputted from the OSD unit 11. The video signal on which the current time is superimposed is recorded at step 306. Then, the microcomputer 10 returns to step 301 to repeat the above operation. With the current time recording request signal received continuously, the down count, which was set to 5 sec at step 304, is decremented by 1 sec at step 307 since the edge detection flag has been set at step 303. The video signal on which the current time is superimposed is continuously outputted from the OSD unit 11 at step 305 until the down count becomes 0 at the step 308. When the down count becomes 0 at step 308 or when the current time recording request signal is not received at step 301, the microcomputer 10 stops the output of the current time to the OSD unit 11 at steps 309 and 310 and then resets the edge detection flat at step 311.

Figure 8:
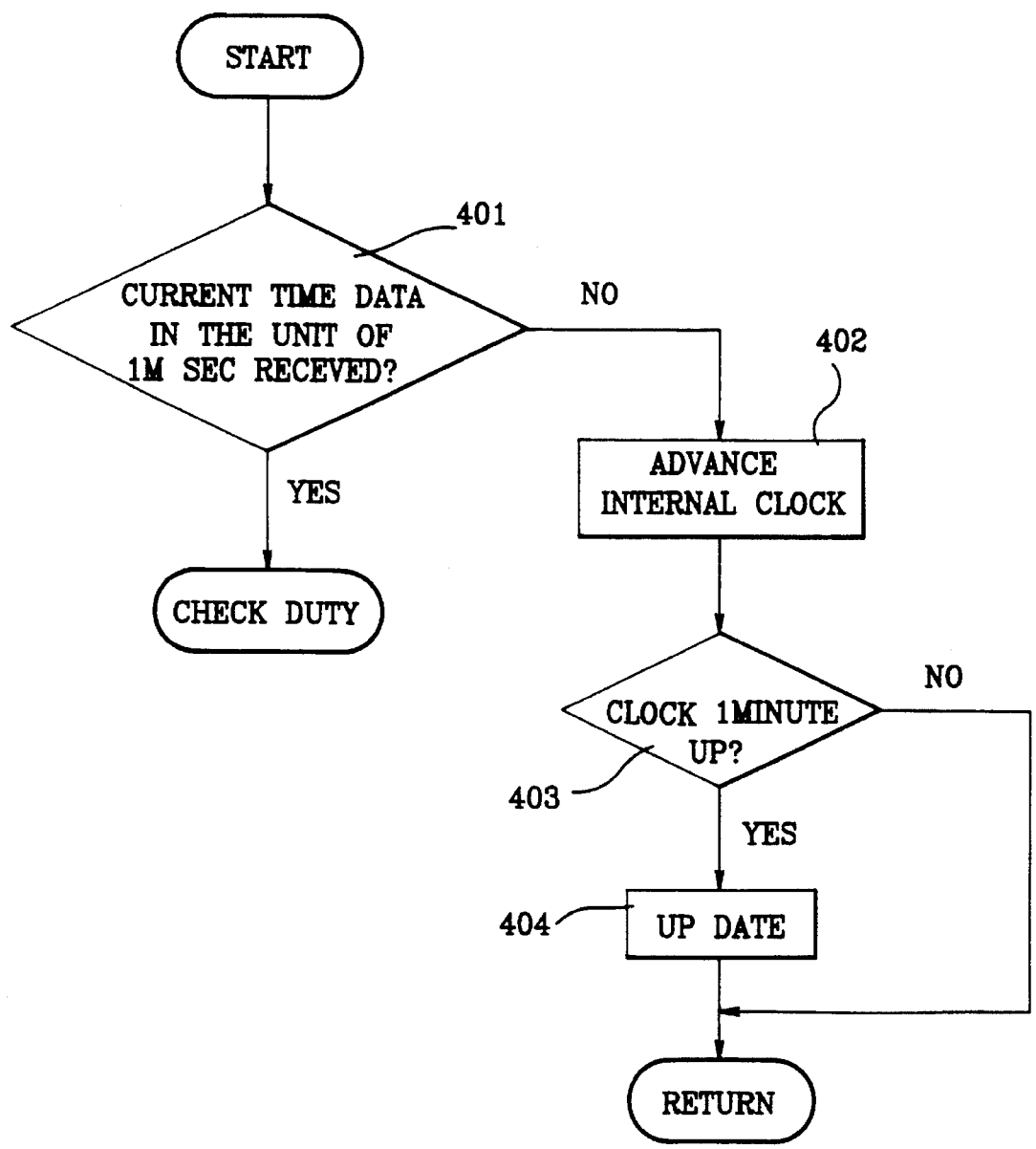
FIG. 8 is a flowchart illustrating the step of displaying the current time using an internal clock when no current time is applied in the method shown in FIG. 5.

Referring to FIG. 8, a flowchart is shown illustrating the fifth step of displaying the current time using the internal clock when no current time data is applied in the method shown in FIG. 5. It is first checked at step 401 whether the current time data is received in 1 msec units. If the current time data is not received, the microcomputer 10 advances the internal clock at step 402. If the clock has been advanced by 1 minute at step 403, the microcomputer 10 converts the advanced clock to the current time, updates it and then returns to step 401 at step 404.

Figure 9:
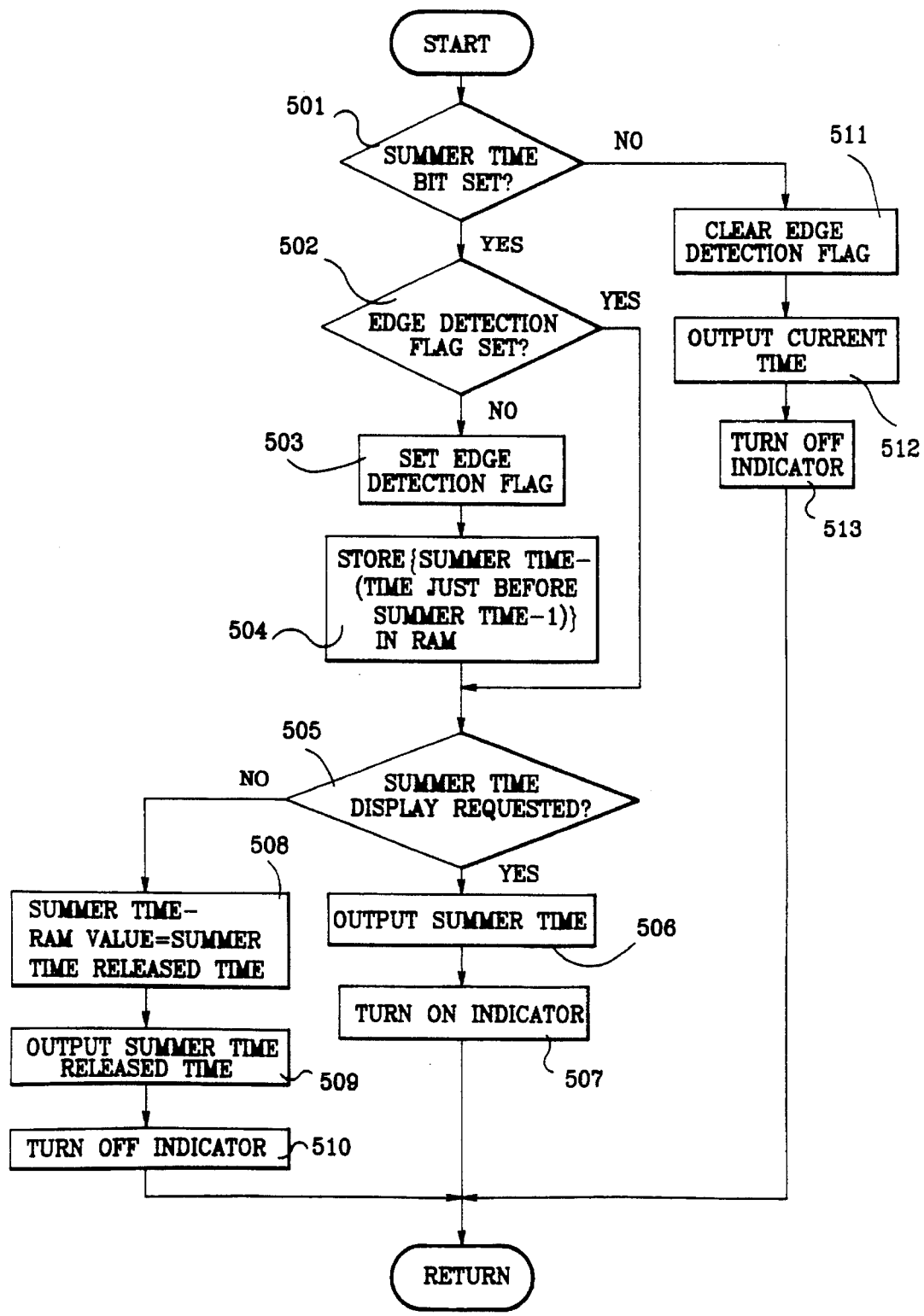
FIG. 9 is a flowchart illustrating the step of processing the current time data including a summer time bit in the method shown in FIG. 5.

Referring to FIG. 9, a flowchart is shown illustrating the sixth step of processing the current time data containing a summer time bit in the method shown in FIG. 5. It is first checked at step 501 whether the summer time bit has been set in the current time data. If the summer time bit has been set in the current time data, the microcomputer 10 sets the edge detection flag at steps 502 and 503 and adds 1 minute to the summer time released time or the time just before the summer time, subtracts the added value from the summer time and stores the resultant value in the RAM at step 504. It is then checked at step 505 whether the summer time display request signal has been applied by the key matrix unit 15. If the summer time display request signal has been applied by the key matrix unit 15, the microcomputer 10 outputs the summer time at step 506 and turns on the light emitting indicator 13 at step 507. Then, the method returns to the second step.

On the other hand, if at step 505 the summer time display request signal has not been applied by the key matrix unit 15, the microcomputer 10 subtracts the value stored in the RAM at step 504 from the summer time at step 508, outputs the resultant time or the summer time released time at step 509 and turns off the light emitting indicator 13 at step 510. If the summer time bit has been reset in the current time data at step 501 because of the release of the summer time while performing the above operation, the microcomputer 10 clears the edge detection flag at step 511, outputs the current time or the summer time released time at step 512 and turns off the light emitting indicator 13 at stop 513. Then the method returns to the second step.

Figure 10:
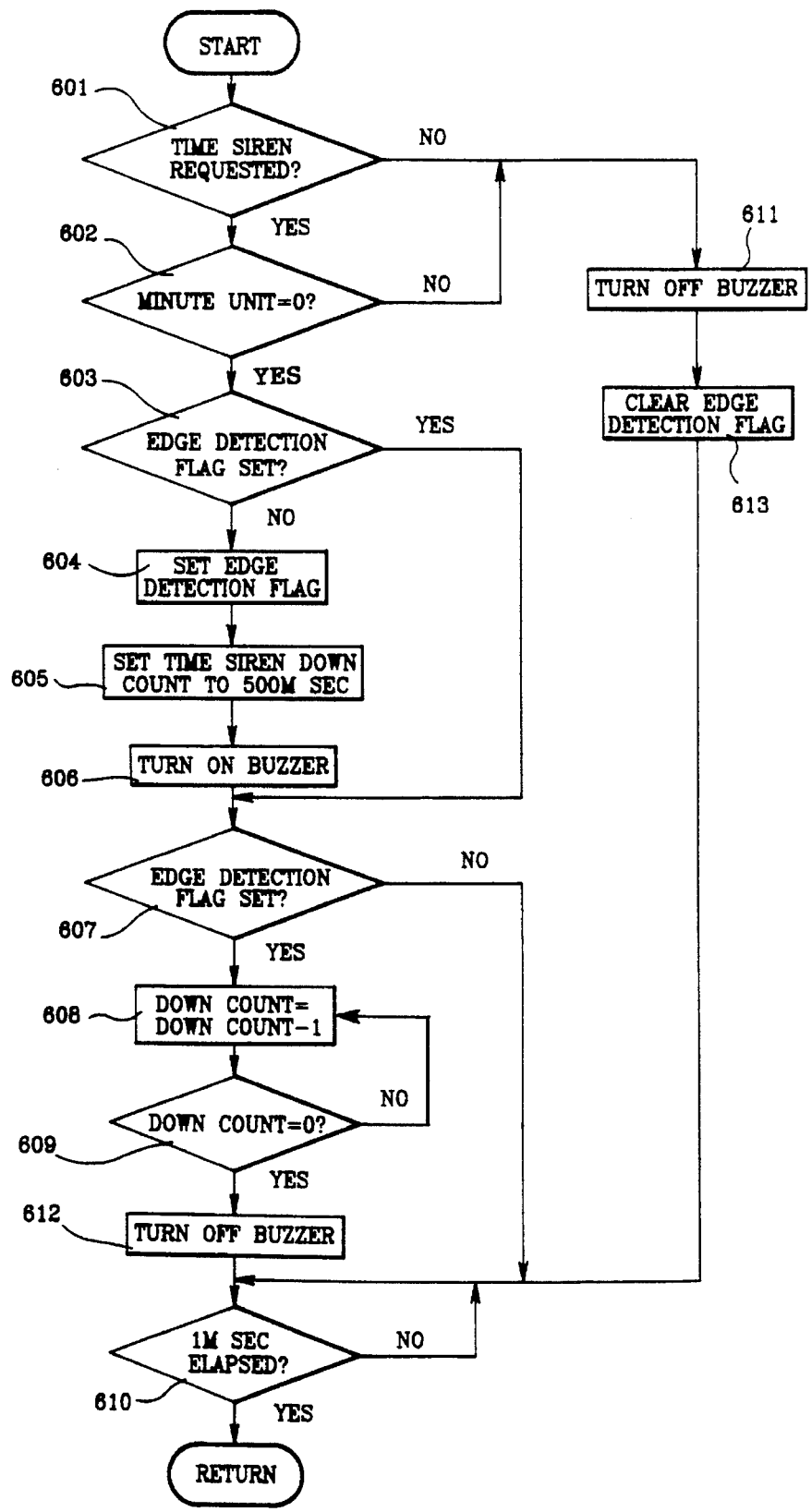
FIG. 10 is a flowchart illustrating the step of generating a time siren upon application of a time siren generation request signal in the method shown in FIG. 5.

Referring to FIG. 10, a flowchart is shown illustrating the seventh step of generating the time siren upon applying of the time siren generation request signal in the method shown in FIG. 5. It is first checked at step 601 whether the time siren generation request signal is received. If the time siren generation request signal is received, step 602 checks whether a minute unit of the current time data is 0. If the minute unit of the current time data is 0, the microcomputer sets the edge detection flag at steps 603 and 604, sets the time siren advancing time or down count to 500 msec at step 605 and turns on the buzzer B1 to generate the time siren at step 606.

Then, it is again checked at step 607 whether the edge detection flag has been set. The time siren advancing time which was set to 500 msec at step 605 is decremented by 1 msec at the step 608 since the edge detection flag has been set at step 604. The time siren is continuously generated until the down count becomes 0 at step 609.

If the down count is 0 at step 609, or if the time siren generation request signal is not received at step 801 or if the minute unit of the current time data is not 0 at step 602, the microcomputer 10 turns off the buzzer B1 at steps 611 and 612 and then clears the edge detection flag at step 613.

As hereinbefore described, according to the present invention, the VCR can record the current time together with the video signal. Also, the current time can be displayed on a CRT of the TV set or a monitor. Hence, the present invention provides advantageous features over the conventional products. Further, the receiving circuit, the wave-shaping circuit, the character display unit, the key matrix unit and the microcomputer may be provided in a remote controller to set and display the current time. With this construction, the remote controller may allow the user to be informed of the current time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A VCR comprising:

receiving means for receiving a current time signal of radio wave from a broadcasting station and for demodulating the received current time signal;

wave-shaping means for converting the demodulated current time signal from said receiving means to a digital signal and for outputting a resultant current time data;

tuning means for receiving audio and video signals of radio wave from the broadcasting station and for tuning the received audio and video signals to a reference frequency;

means for recording and playing back the audio and video signals and the current time signal from the broadcasting station;

control means for controlling the operation of the VCR, for determining logic states of the digital signal from said wave-shaping means in accordance with a duty cycle of the digital signal and for converting the current time data to the current time in accordance with the determined logic states;

on-screen display means for superimposing the current time on the video signal from said tuning means under control by said control means and for outputting a resultant signal to one of said recording and playing back means and an external display means;

character display means for displaying the current time from said control means; and key matrix means for applying function signals to said control means according to a user's selection.

2. A VCR according to claim 1, further comprising:

light emitting indicating means for indicating summer time when the current time from said control means is the summer time.

3. A VCR according to claim 1, further comprising:

means for generating a time siren when a time siren function is selected using said key matrix means.

4. A VCR according to claim 1, wherein said receiving means includes:

a first receiving antenna for receiving the current time signal of radio wave from the broadcasting station;

a first amplifier for amplifying the received current time signal;

a filter for filtering an output signal from said first amplifier;

a second amplifier for amplifying an output signal from said filter;

a demodulator for demodulating an output signal from said second amplifier; and an automatic gain controller for automatically controlling gains of said first and second amplifiers.

5. A VCR according to claim 1, wherein said receiving means includes:

a reception sensitivity selecting circuit for receiving the current time signal of radio wave from the broadcasting station in different receiving directions and for selecting the current time signal of a better reception sensitivity;

a frequency selecting circuit for selecting a frequency convenient for reception when the VCR is placed at a center position between two broadcasting station regions of different transmitting frequencies for the current time signal;

an amplifier for amplifying an output signal from said frequency selecting circuit;

a demodulator for demodulating an output signal from said amplifier; and an automatic gain controller for automatically controlling a gain of said amplifier.

6. A VCR according to claim 5, wherein said reception sensitivity selecting circuit includes:

a second amplifier for receiving the current time signal of radio wave from the broadcasting station through a receiving antenna and for amplifying the received current time signal;

a third amplifier for receiving the current time signal of radio wave from the broadcasting station through another receiving antenna from a receiving direction different from that of said second amplifier and for amplifying the received current time signal;

a switch for selecting one of output signals from said first and second amplifiers; and a comparator for comparing the output signals from said first and second amplifiers to select the one having a better reception sensitivity and controlling said switch in accordance with the comparison.

7. A VCR according to claim 5, wherein said frequency selecting circuit includes:

a first filter for performing a filtering operation at a transmitting frequency of one of the broadcasting station regions;

a second filter for performing a filtering operation at a transmitting frequency of the other of the broadcasting station regions; and a switch for selecting one of the first and second filters.

* * * * *